(12) United States Patent
Shimura et al.

(10) Patent No.: US 6,557,405 B2
(45) Date of Patent: May 6, 2003

(54) INTERNAL INFORMATION DETECTOR FOR PRESSURE VESSEL

(75) Inventors: Kazuhiro Shimura, Hiratsuka (JP); Mitsuru Naito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/919,893

(22) Filed: Aug. 2, 2001

(65) Prior Publication Data

US 2002/0033051 A1 Mar. 21, 2002

(30) Foreign Application Priority Data

| Aug. 3, 2000 | (JP) | ................................... 2000-235307 |
| Aug. 3, 2000 | (JP) | ................................... 2000-235310 |
| Aug. 3, 2000 | (JP) | ................................... 2000-235311 |

(51) Int. Cl.[7] ........................ G01H 17/02; E01C 23/00; B60C 23/02
(52) U.S. Cl. ........................................ 73/146; 73/146.5
(58) Field of Search ................................ 73/146–146.8, 73/718, 724, 514.19, 756; 340/442, 445, 447; 200/250, 276, 86; 280/278, 279, 287

(56) References Cited

U.S. PATENT DOCUMENTS

| 3,721,784 A | * | 3/1973 | Viracola | .................. 200/86 |
| 4,419,891 A | * | 12/1983 | Browning | .................. 73/382 |
| 5,181,418 A | * | 1/1993 | Bartscher et al. | .......... 73/146.8 |
| 5,377,539 A | * | 1/1995 | LaSalle | .................. 73/146.8 |
| 6,101,870 A | * | 8/2000 | Kato et al. | .................. 73/146.8 |
| 6,199,575 B1 | * | 3/2001 | Widner | .................. 137/227 |
| 6,340,929 B1 | * | 1/2002 | Katou et al. | .................. 340/447 |

* cited by examiner

*Primary Examiner*—Hezron Williams
*Assistant Examiner*—Marissa L Ferguson
(74) *Attorney, Agent, or Firm*—Rader, Fishman & Grauer PLLC (57) ABSTRACT

An internal information detector is disclosed, which is capable of preventing the leakage of pressure from an attached portion to a pressure vessel, and also preventing the interference with the pressure vessel. This internal information detector comprises a pressure injection valve penetrating a partition wall of the rotatable pressure vessel, the pressure injection valve being fixed to the pressure vessel; and an information detection unit located in the pressure vessel to detect information inside the vessel, the information detection unit being united with the pressure injection valve. The position of a center of gravity is adjusted to cancel a rotation moment caused by a centrifugal force during the rotation of the pressure vessel.

7 Claims, 6 Drawing Sheets

INTERNAL INFORMATION DETECTOR FOR PRESSURE VESSEL

BACKGROUND OF THE INVENTION

This invention relates to an internal information detector for detecting information regarding temperature, pressure or the like in a pressure vessel. More specifically, the invention relates to an internal information detector for a pressure vessel, which is capable of preventing a leakage of pressure from an attached portion, and also preventing an interference with the pressure vessel.

As a detection apparatus for detecting information regarding temperature, pressure or the like inside a tire, one has been presented, including a pressure injection valve penetrating a rim, and an information detection unit located inside the tire to detect various kinds of information and united with the pressure injection valve. The foregoing information detection unit collects data regarding temperature, pressure, and so on, and sends the data to the outside of the tire. Such an internal information detector is supported entirely on the rim by attaching the pressure injection valve to the rim with a grommet made of an elastic material interposed therebetween.

However, when the above internal information detector is installed in a rotatable pressure vessel like a tire and rotated at a high speed, a rotation moment is applied around the valve due to the unbalance of the information detection unit. Thus, there was a problem of a reduction in pressure, caused by a leakage of air mainly from the attached portion. Such an air leakage is further aggravated by a reduction in an elastic force caused by the chronical deterioration of the valve grommet, vibration during traveling, a sudden change in a centrifugal force caused by acceleration or deceleration, and so on. In addition, when the forgoing rotation moment causes the information detection unit to rotate around the valve, an unnecessary interference occurs between the information detection unit and the pressure vessel. Thus, there was a possibility that the detection apparatus would be adversely affected, or that an attached screw would be loosened by rotation, causing an air leakage.

SUMMARY OF THE INVENTION

It is a first object of the present invention to provide an internal information detector for a pressure vessel, which is capable of preventing the leakage of pressure from an attached portion, and also preventing an interference with the pressure vessel.

It is a second object of the invention to provide an attaching structure of an internal information detector for a pressure vessel, which is capable of preventing the leakage of pressure for a long period of time.

In order to achieve the foregoing objects, in accordance with the invention, an internal information detector for a pressure vessel is provided, comprising: a pressure injection valve penetrating a partition wall of a rotatable pressure vessel, the pressure injection valve being fixed to the pressure vessel; and an information detection unit located in the pressure vessel to detect information inside the vessel, the information detection unit being united with the pressure injection valve. In this case, a plurality of electronic components are loaded on the information detection unit, and based on a disposition of the electronic components, a center of gravity of the information detection unit is set on a center plane passing through center axes respectively of the pressure injection valve and the pressure vessel.

Since the internal information detector is constructed in such a manner that based on the disposition of the electronic components, the center of gravity of the information detection unit is set on the center plane passing through the center axes respectively of the pressure injection valve and the pressure vessel, and a well-balanced detection apparatus is thereby constituted across the center plane, a rotation moment generated by a centrifugal force during the rotation of the pressure vessel can be canceled. As a result, it is possible to prevent the leakage of pressure from the attached portion of the internal information detector, and also to prevent the interference of the information detection unit with the pressure vessel.

More specifically, when the plurality of electronic components include a battery and substrates respectively for a sensor and a transmitter, the battery as a heaviest article may be disposed in a position of the center plane, the substrate for the sensor may be disposed in one side of the regions divided by the center plane, and the substrate for the transmitter may be disposed in the opposite side of the regions divided by the center plane. Alternatively, the battery as a heaviest article may be disposed in one side of the regions divided by the center plane, and the substrates for the sensor and the transmitter may be disposed in the opposite side of the regions divided by the center plane.

In order to achieve the foregoing objects, in accordance with the invention, an internal information detector for a pressure vessel is provided, comprising: a pressure injection valve penetrating a partition wall of a rotatable pressure vessel, the pressure injection valve being fixed to the pressure vessel; and an information detection unit located in the pressure vessel to detect information inside the vessel, the information detection unit being united with the pressure injection valve. In this case, a center of gravity of the entire detection apparatus including the information detection unit and the pressure injection valve is set on the attached portion to the pressure vessel.

Since the internal information detector is constructed in such a manner that the center of gravity of the entire detection apparatus is set on the attached portion to the pressure vessel, and balance is set in both sides of the attached portion, rotation moments generated by a centrifugal force during the rotation of the pressure vessel, which are applied on a valve part located outside the vessel and on the information detection unit located inside the vessel, can be canceled by each other. Thus, it is possible to prevent the leakage of pressure from the attached portion of the internal information detector, and also to prevent the interference of the information detection unit with the pressure vessel.

In the foregoing constitution, to effectively carry out an adjustment of a center of gravity, preferably, a cap made of a weight member is provided to a portion of the pressure injection valve extended to the outside of the pressure vessel.

In order to achieve the foregoing object, in accordance with the invention, an attaching structure of an internal information detector for detecting information inside a pressure vessel, the internal information detector comprising a pressure injection valve penetrating a partition wall of a rotatable pressure vessel; and an information detection unit located in the pressure vessel to detect information inside the vessel, the information detection unit being united with the pressure injection valve, wherein the pressure injection valve is attached to the pressure vessel with a grommet made of an elastic material interposed therebetween; and the information detection unit is secured to a pedestal provided in the partition wall of the pressure vessel Since the pressure injection valve is attached to the pressure vessel with the elastic material grommet interposed therebetween, and the information detection unit is secured to the pedestal provided in the partition wall of the pressure vessel, the formation of a very small gap between the elastic material grommet and the partition wall of the pressure vessel hardly occurs even when a sudden change occurs in a centrifugal force due to vibration, acceleration or deceleration during traveling. Thus, it is possible to prevent the leakage of pressure for a long period of time.

In the foregoing constitution, the information detection unit can be secured to the pedestal by using mechanical connecting means or adhesive. As mechanical connecting means, fastening by a screw member, fitting-in by a spring member, or engaging by use of a claw member can be used.

In order to achieve the foregoing object, in accordance with the invention, an attaching structure of an internal information detector for detecting information inside a pressure vessel, the internal information detector comprising a pressure injection valve penetrating a partition wall of a rotatable pressure vessel; and an information detection unit located in the pressure vessel to detect information inside the vessel, the information detection unit being united with the pressure injection valve, wherein a through-hole larger than an outer diameter of the pressure injection valve is provided in the partition wall of the pressure vessel; in an outer peripheral side of the pressure injection valve, externally provided are a grommet made of an elastic material having a small-diameter part insertable into the through-hole and a large-diameter part having an outer diameter larger than the through-hole and a hard grommet; the pressure injection valve is fixed to the pressure vessel while the partition wall is held between the elastic material grommet and the hard grommet; and a hardness Hs (JIS-A) of at least the small-diameter part of the elastic material grommet is set in a range of 70 to 90.

As described above, for the attachment of the pressure injection valve to the pressure vessel with the elastic material grommet interposed therebetween, the small-diameter part insertable into the through-hole and the large-diameter part having the outer diameter larger than the through-hole are provided in the elastic material grommet, and the hardness Hs of at least the small-diameter part is set high. Thus, the formation of a very small gap between the elastic material grommet and the partition wall of the pressure vessel hardly occurs even when a sudden change occurs in a centrifugal force due to vibration, acceleration or deceleration during traveling. As a result it is possible to prevent the leakage of pressure for a long period of time.

In order to achieve the foregoing object, in accordance with the invention, an attaching structure of an internal information detector for detecting information inside a pressure vessel, the internal information detector comprising a pressure injection valve penetrating a partition wall of a rotatable pressure vessel; and an information detection unit located in the pressure vessel to detect information inside the vessel, the information detection unit being united with the pressure injection valve, wherein a through-hole larger than an outer diameter of the pressure injection valve is provided in the partition wall of the pressure vessel; in an outer peripheral side of the pressure injection valve, externally provided are a grommet made of an elastic material having a small-diameter part insertable into the through-hole and a large-diameter part having an outer diameter larger than the through-hole, and a hard grommet; the pressure injection valve is fixed to the pressure vessel while the partition wall is held between the elastic material grommet and the hard grommet; a hardness Hs (JIS-A) of the elastic material grommet is set in a range of 65 to 85; a volume of a space formed between the through-hole and the pressure injection valve is set smaller by 1% to 25% than that of the small-diameter part of the elastic material grommet; and the small-diameter part is held in a compressed state in the space.

As described above, for the attachment of the pressure injection valve to the pressure vessel through the elastic material grommet, the small-diameter part insertable into the through-hole and the large-diameter part having the outer diameter larger than the through-hole are provided in the elastic material grommet, and the small-diameter part is compressed to set the hardness Hs high during attaching. Thus, the formation of a very small gap between the elastic material grommet and the partition wall of the pressure vessel hardly occurs even when a sudden change occurs in a centrifugal force due to vibration, acceleration or deceleration during traveling. As a result, it is possible to prevent the leakage of pressure for a long period of time.

BRIEF DESCRIPTION OF THE DRAWINGS

FIGS. 6(a) and 6(b) are views showing an attaching structure of an internal information detector for a pressure vessel according to a fourth embodiment of the invention: FIG. 6(a) being a plane view; and FIG. 6(b) being a partially cutaway side view.

FIGS. 7(a) and 7(b) are views showing an attaching structure of an internal information detector for a pressure vessel according to a fifth embodiment of the invention: FIG. 7(a) being a plane view; and FIG. 7(b) being a partially cutaway side view.

FIGS. 8(a) and 8(b) are views showing an attaching structure of an internal information detector for a pressure vessel according to a sixth embodiment of the invention: FIG. 8(a) being a plane view; and FIG. 8(b) being a partially cutaway side view.

FIGS. 9(a) and 9(b) are views showing an attaching structure of an internal information detector for a pressure vessel according to a seventh embodiment of the invention: FIG. 9(a) being a plane view; and FIG. 9(b) being a partially cutaway side view.

DETAILED DESCRIPTION OF THE PREFERRED EMBODIMENTS

Next, a constitution of the present invention will be described in detail with reference to the accompanying drawings.

Figure 1:
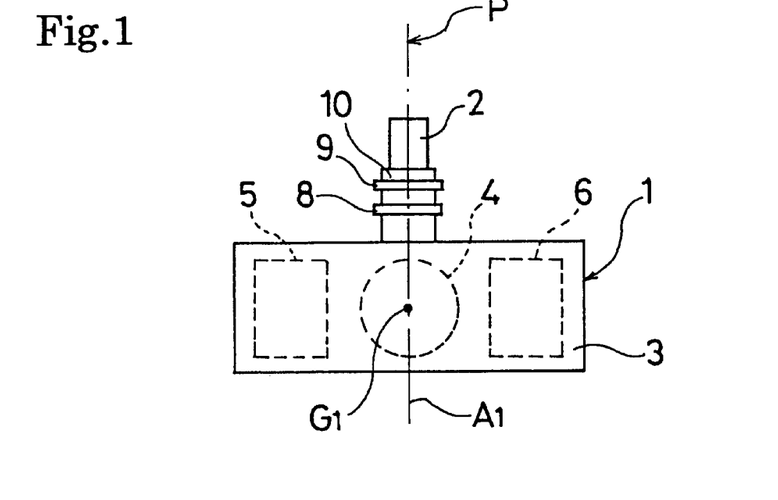
FIG. 1 is a plane view showing an internal information detector for a pressure vessel according to a first embodiment of the present invention.
Figure 2:
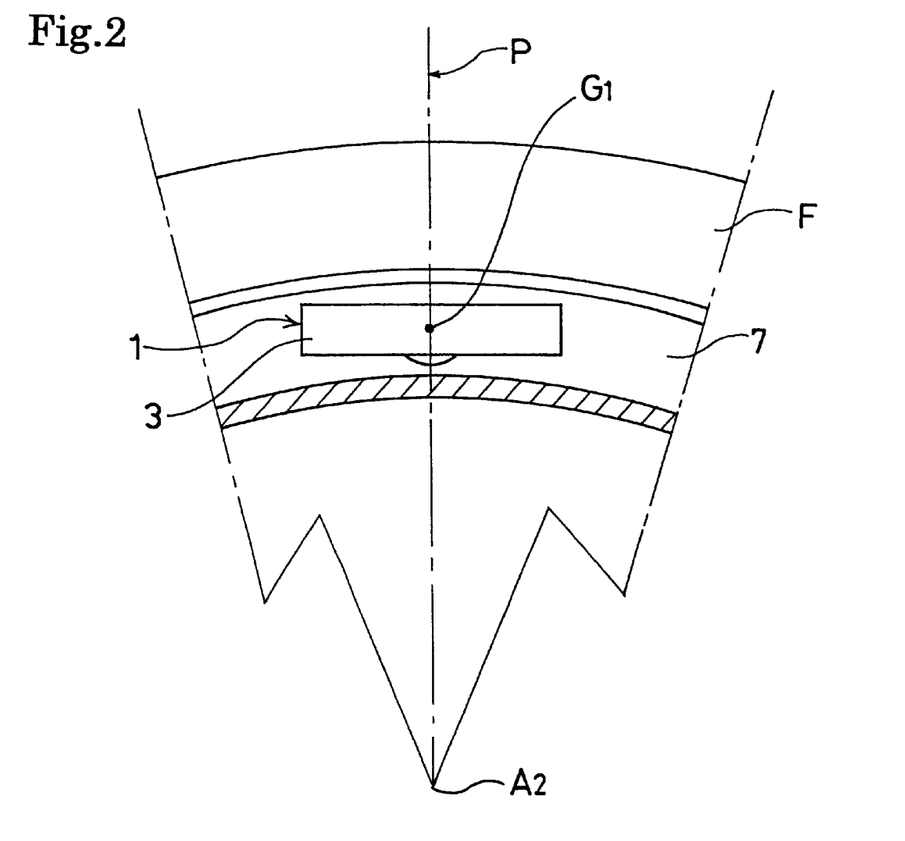
FIG. 2 is a partially cutaway front view showing an attached state of the internal information detector according to the first embodiment.
Figure 3:
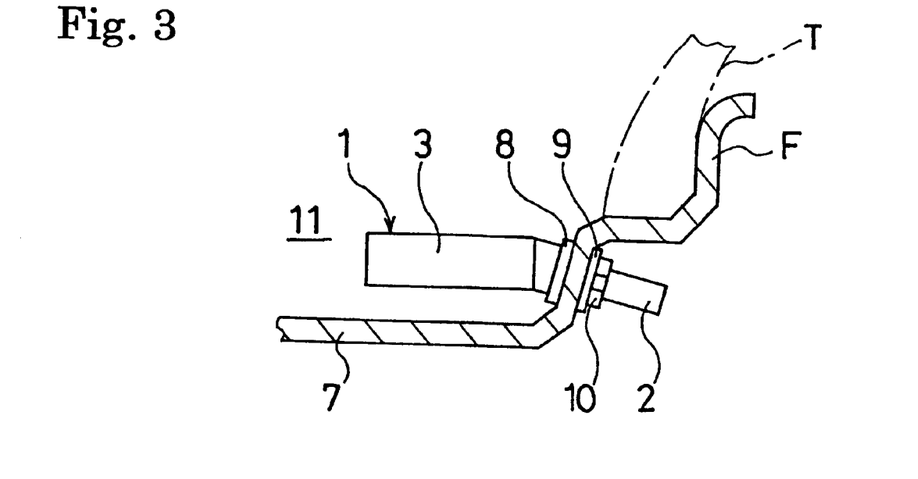
FIG. 3 is a partially cutaway side view showing the attached state of the internal information detector according to the first embodiment.

FIG. 1 shows an internal information detector of a pressure vessel according to a first embodiment of the invention; and FIGS. 2 and 3 show attached states thereof. According to the embodiment, a rotatable pressure vessel is composed of a wheel rim and a pneumatic tire. In this case, the rim is equivalent to a partition wall of the pressure vessel for loading the internal information detector.

As shown in FIG. 1, an internal information detector 1 comprises a cylindrical pressure injection valve 2 penetrating the rim, and an information detection unit 3 located in a tire air chamber to detect information inside the tire. The information detection unit 3 is united with the pressure injection valve 2. The pressure injection valve 2 includes a check valve in its cylinder, and permits a pressure injection only from the outside to the inside of the tire except for the time of valve releasing. On the other hand, the information detection unit 3 includes, loaded as electronic components thereon, a battery 4, a sensor substrate 5 having an air pressure sensor and a temperature sensor, and a transmitter substrate 6 having a transmitter. The information detection unit 3 measures a tire air pressure by the air pressure sensor, and a temperature inside the tire by the temperature sensor, and then automatically transmits the result of measurement to the outside of the tire.

As shown in FIGS. 2 and 3, a through-hole, not shown, is formed in the side wall part of a rim 7 extending in a tire diameter direction, and the pressure injection valve 2 is inserted into this through-hole. In the outer peripheral side of the pressure injection valve 2, an elastic material grommet 8 and a hard grommet 9 are fitted holding the rim 7 therebetween, and by fastening a nut 10 engaged with the pressure injection valve 2, the pressure injection valve 2 is fixed to the rim 7. A bead portion of a pneumatic tire T is loaded along a flange F of the rim 7, and a tire air chamber 11 is formed in the outer peripheral side of the rim 7.

Here, assuming that a plane passing through a center axis $A_1$ of the pressure injection valve 2 shown in FIG. 1 and a center axis $A_2$ of the rim 7 shown in FIG. 2 is set as a center plane P of the information detection unit 3, a center of gravity $G_1$ for the information detection unit 3 is set on the center plane P. According to the embodiment, the battery 4 as a heaviest article is disposed in the position of the center plane P, the sensor substrate 5 is disposed in one of regions divided by the center plane P, and the transmitter substrate 6 is disposed in the opposite one of the regions divided by the center plane P. Thus, the center of gravity $G_1$ for the information detection unit 3 is set on the center plane P.

By setting the center of gravity G1 for the information detection unit 3 on the center plane P to optimize the balance of the entire detection apparatus, the rotation moment generated by a centrifugal force during the tire rotation can be canceled. Thus, it is possible to prevent the leakage of pressure from the attached portion of the internal information detector 1. In addition, since the displacement of the information detection unit 3 around the valve hardly occurs, the interference between the information detection unit 3 and the rim 7 can be prevented.

Figure 4:
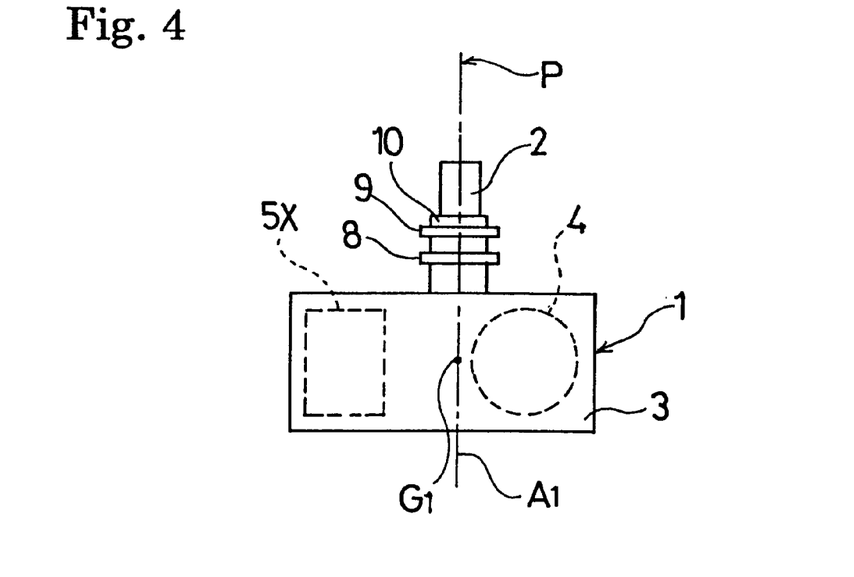
FIG. 4 is a plane view showing an internal information detector for a pressure vessel according to a second embodiment of the invention.

FIG. 4 shows an internal information detector for a pressure vessel according to a second embodiment of the invention. The second embodiment is different from the first embodiment only in the disposition of electronic components in the information detection unit. Thus, the same portions are denoted by the same reference numerals, and detailed descriptions thereof will be omitted.

In FIG. 4, the information detection unit 3 includes, loaded as electronic components thereon, a battery 4, and a sensor/transmitter substrate 5X equipped with an air pressure sensor, a temperature sensor and a transmitter. According to the embodiment, the battery 4 as a heaviest article is disposed in one side of the regions divided by a center plane P, and the sensor/transmitter substrate 5X is disposed in the opposite side of the regions divided by the center plane P. Thus, a center of gravity $G_1$ for the information detection unit 3 is set on the center plane P. Needless to say, as in the first embodiment, sensor and transmitter substrates 5 and 6 may be individually provided, and disposed in a region opposite the battery 4.

Figure 5:
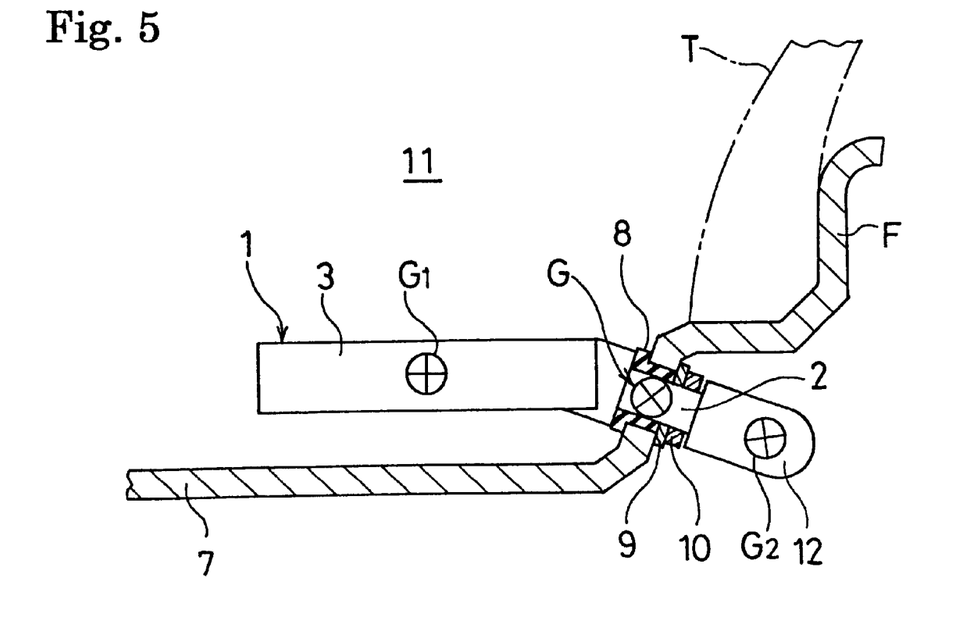
FIG. 5 is a partially cutaway side view showing an internal information detector for a pressure vessel according to a third embodiment of the invention.

FIG. 5 shows an internal information detector for a pressure vessel according to a third embodiment of the invention. In the embodiment, the same portions as those of the first embodiment are denoted by the same reference numerals, and detailed description thereof will be omitted. The structure of the third embodiment can be applied to the first or second embodiment.

As shown in FIG. 5, a cap 12 is detachably attached to the outer end part of the pressure injection valve 2. A center of gravity G for the entire detection apparatus including the information detection unit 3 and the pressure injection valve 2 is set in the center position of an attached portion to the rim 7, i.e., in the position of intersection between the center axis of the pressure injection valve 2 and the center position of the rim 7 in the thickness direction thereof. Such an adjustment of a center of gravity can be carried out by mutually adjusting a distance from the center of gravity $G_1$ of the information detection unit 3 to the center position of the attached portion, and a distance from the center of gravity $G_2$ of a valve portion present outside the rim, such as the pressure injection valve 2, a nut 10, the cap 12 or the like, to the center position of the attached portion. Moreover, the adjustment of a center of gravity can be carried out by mutually adjusting the weight of the information detection unit 3 and the weight of the valve portion present outside the rim.

Especially, to effectively carry out the foregoing adjustment of a center of gravity, the cap 12 can be composed of a weight member. For example, the gap 12 may be made of a resin, having a metallic weight member buried therein, or the cap 12 may be made of metal. As the other adjustment means of a center of gravity, a battery as a power source for the information detection unit 3 may be loaded on the outer end part of the pressure injection valve 2.

Accordingly, by setting the gravity center G of the entire detection apparatus on the attached portion to the rim 7 to optimize balance, rotation moments generated by a centrifugal force during the tire rotation, which affect the valve portion located outside the rim and the information detection unit 3 located inside the rim, can be canceled by each other. Therefore, it is possible to prevent the leakage of pressure from the attached portion of the internal information detector 1. Moreover, since it is difficult for the information detection unit 3 to swing around the attached portion, it is possible to prevent interference between the information detection unit 3 and the rim 7.

Figures 6A, 6B:
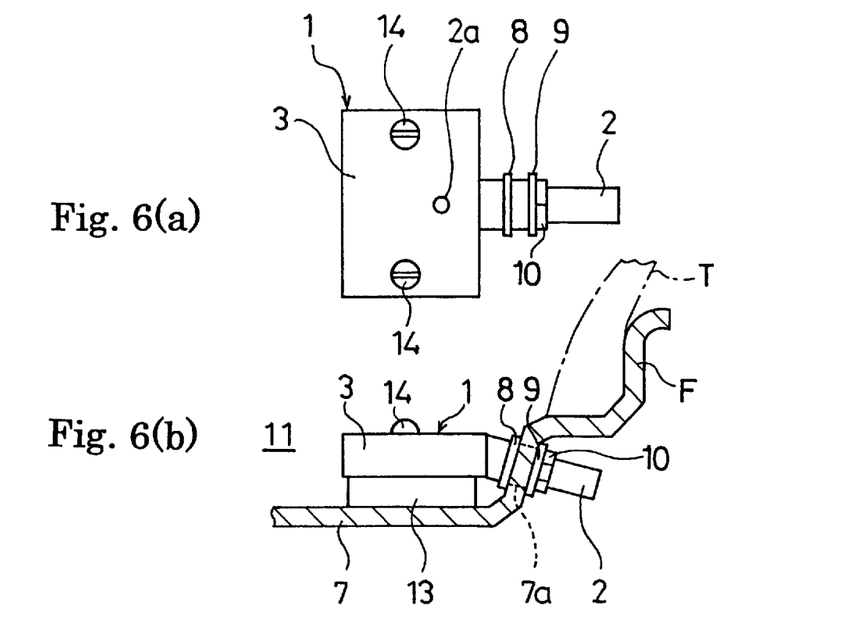

Each of FIGS. 6(*a*) and 6(*b*) shows an attaching structure of an internal information detection unit for a pressure vessel according to a fourth embodiment of the invention. According to the embodiment, the rotatable pressure vessel is composed of a wheel rim and a pneumatic tire. In this case, the rim is equivalent to a partition wall of the pressure vessel, in which the internal information detector is loaded.

As shown in FIGS. 6(*a*) and 6(*b*), a through-hole 7*a* is formed in the side wall part of the rim 7 extending in a tire diameter direction, and a pedestal 13 made of a stiff body is disposed in a rim outer peripheral surface in the vicinity of the through-hole 7a. The bead portion of a pneumatic tire T is loaded along the flange F of the rim 7, and a tire air chamber 11 is formed in the outer peripheral side of the rim 7.

The internal information detector 1 comprises a cylindrical pressure injection valve 2, and an information detection unit 3 located in the tire air chamber 11 to detect information inside the tire. The information detection unit 3 is united with the pressure injection valve 2. The pressure injection valve 2 includes a check valve in its cylinder, and permits the pressure injection only from the outside to the inside of the tire except for the time of valve releasing. The air supplied from the outside of the tire is sent through an inlet 2a into the tire air chamber 11.

On the other hand, the information detection unit 3 includes, housed as electronic components therein, not shown, an air pressure sensor, a temperature sensor, a transmitter, a battery, and so on. This information detection unit 3 measures a tire air pressure by an air pressure sensor, and a temperature inside the tire by the temperature sensor, and then automatically transmits the result of measurement to the outside of the tire. In addition, a plurality of screw holes, not shown, are formed in the information detection unit 3 and the pedestal 13 to be extended in a tire diameter direction, and a screw 14 is fastened in each screw hole.

Figure 10:
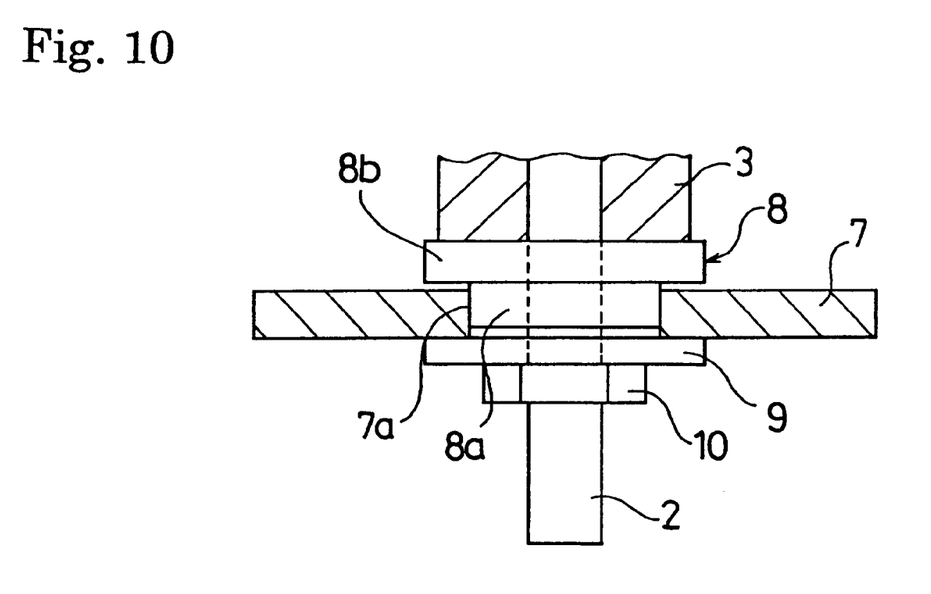
FIG. 10 is an enlarged sectional view showing main portions of an attaching structure of the invention.

FIG. 10 shows an enlarged view of the attaching structure of the pressure injection valve 2. As shown in FIG. 10, the inner diameter of the through-hole 7a in the rim 7 is set larger than the outer diameter of the pressure injection valve 2. Around the outer peripheral side of the pressure injection valve 2, an elastic material grommet 8 and a hard grommet 9 are fitted holding the rim 7 therebetween, and by fastening the nut 10 engaged with the pressure injection valve 2, the pressure injection valve 2 is fixed to the rim 7. The elastic material grommet 8 is made of an elastic material such as rubber or the like, and provided with a small-diameter part 8a insertable into the through-hole 7a, and a large-diameter part 8b having an outer diameter larger than the through-hole 7a. The hard grommet 9 is made of a hard material such as metal or the like.

To install the foregoing internal information detector 1 in the rim 7, the pressure injection valve 2 is attached to the rim 7 through the elastic material grommet 8 by fastening the nut 10, and the information detection unit 3 is secured to the pedestal 13 provided in the rim outer surface by fastening the screw 14. By this attaching structure, the formation of a very small gap between the elastic material grommet 8 and the rim 7 hardly occurs even when a sudden change occurs in a centrifugal force due to vibration, acceleration or deceleration during traveling. Thus, it is possible to prevent the leakage of pressure for a long period of time.

Figures 7A, 7B:
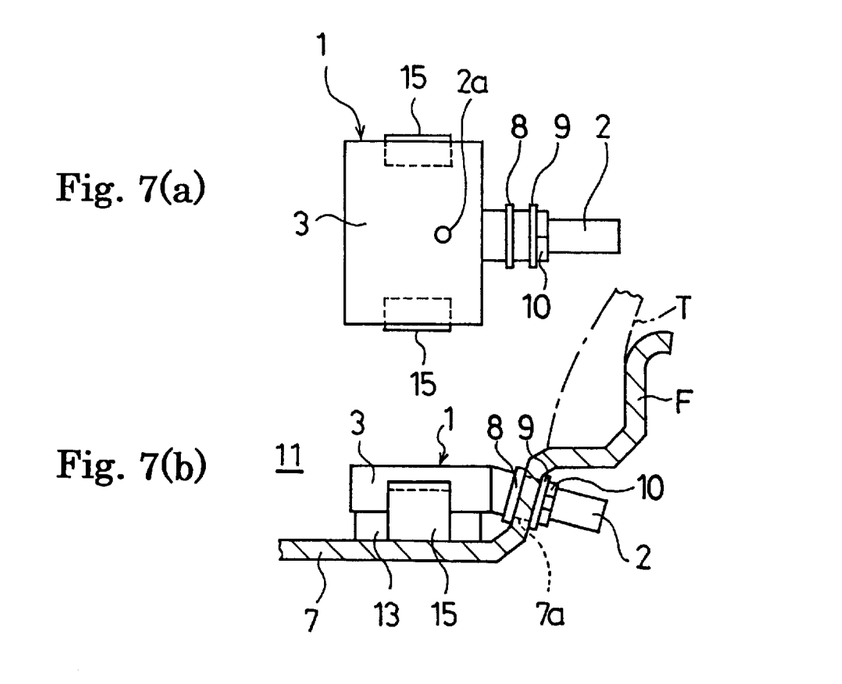
Figures 8A, 8B:
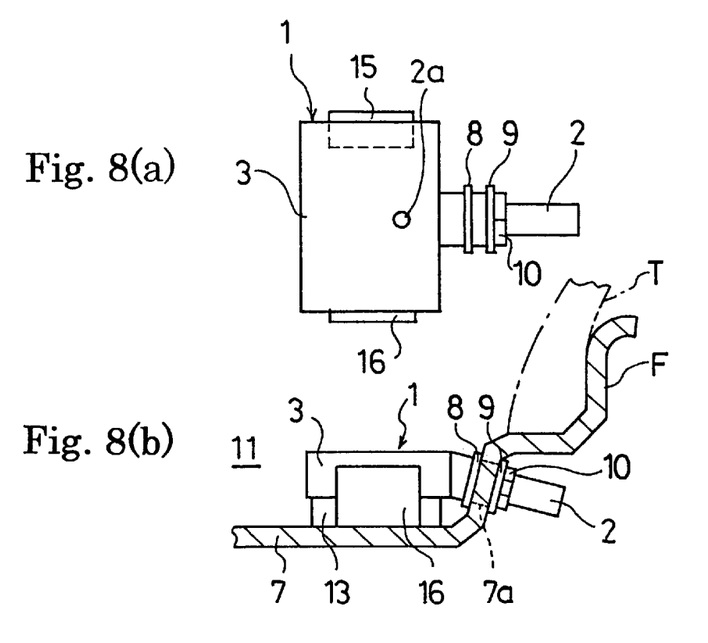

Each of FIGS. 7(a) and 7(b) shows the attaching structure of a internal information detector for a pressure vessel according to a fifth embodiment of the invention. Each of FIGS. 8(a) and 8(b) shows the attaching structure of an internal information detector for a pressure vessel according to a sixth embodiment of the invention. These embodiments are different from the fourth embodiment only in the securing structure of the information detection unit. Thus, portions the same as those of the fourth embodiment are denoted by the same reference numerals, and detailed descriptions thereof will be omitted.

In FIGS. 7(a) and 7(b), the pedestal 13 includes claw members 15 and 15 provided to be engaged with both left and right sides of the information unit 3. In this case, the pressure injection valve 2 is attached to the rim 7 through the elastic material grommet 8 by fastening the nut 10, and the information detection unit 3 is secured to the pedestal 13 by using the pair of claw members 15 and 15.

In FIGS. 8(a) and 8(b), the pedestal 13 is provided with a claw member 15 engaged with one side part of the information detection unit 3, and a spring member 16 for elastically pressing the other side part of the information detection unit 3. In this case, the pressure injection valve 2 is attached to the rim 7 through the elastic material grommet 8 by fastening the nut 10, and the information detection unit 3 is secured to the pedestal 13 by using the claw member 15 and the spring member 16.

The information detection unit 3 may be secured to the pedestal 13 by using adhesive other than various mechanical connecting means described above.

Figures 9A, 9B:
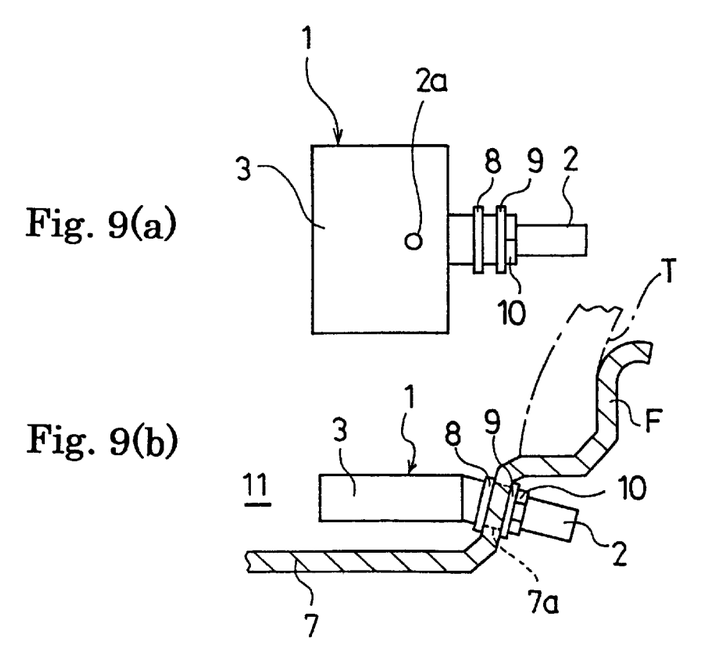

Each of FIGS. 9(a) and 9(b) shows the attaching structure of an internal information detector for a pressure vessel according to a seventh embodiment of the invention. In the embodiment, portions the same as those of the fourth embodiment are denoted by the same reference numerals, and detailed descriptions thereof will be omitted.

As shown in FIGS. 9(a) and 9(b), a through-hole 7a is formed in the side wall part of the rim 7 extending in a tire diameter direction. The pressure injection valve 2 of the internal information detector 1 is attached to the rim 7 through the elastic material grommet 8, and thereby the internal information detector 1 is supported on the rim 7.

As shown in FIG. 10, the inner diameter of the through-hole 7a in the rim 7 is set larger than the outer diameter of the pressure injection valve 2. Around the outer peripheral side of the pressure injection valve 2, the elastic material grommet 8 and the hard grommet 9 are fitted holding the rim 7 therebetween. By fastening the nut 10 engaged with the pressure injection valve 2, the pressure injection valve 2 is fixed to the rim 7. The elastic material grommet 8 is made of an elastic material such as rubber or the like, and provided with a small-diameter part 8a insertable into the through-hole 7a, and a large-diameter part 8b having an outer diameter larger than the through-hole 7a. The hard grommet 9 is made of a hard material such as metal or the like.

In the attaching structure shown in each of FIGS. 9(a) and 9(b), the hardness Hs (JIS-A) of at least the small-diameter part 8a of the elastic material grommet 8 is set in the range of 70 to 90, preferably in the range of 75 to 90. On the other hand, the hardness Hs (JIS-A) of the large-diameter part 8b is set in the range of 65 to 85. The small-diameter part 8a and the large-diameter part 8b may be set to either equal hardness or different hardness as long as they satisfy the above ranges.

As describe above, when the pressure injection valve 2 is attached to the rim 7 through the elastic material grommet 8, the small and large diameter parts 8a and 8b are provided in the elastic material grommet 8, and the hardness Hs of at least the small-diameter part 8a is set high. Thus, the formation of a very small gap between the elastic material grommet 8 and the rim 7 hardly occurs even when a sudden change occurs in a centrifugal force due to vibration, acceleration or deceleration during traveling. It is therefore possible to prevent the leakage of pressure for a long period of time.

In the attaching structure shown in each of FIGS. 9(a) and 9(b), in addition to setting the small-diameter part 8a of the elastic material grommet 8 hard based on a material quality, the small-diameter part 8a can be set hard based on dimension setting described below. That is, the hardness Hs (JIS-A) of the elastic material grommet 8 is set in the range of 65 to 85, the volume of a space formed between the through-hole 7a and the pressure injection valve 2 is set smaller by 1% to 25% than that of the small-diameter part 8a of the elastic material grommet 8, and the small-diameter part 8a is compressed during attaching. Accordingly, the small-diameter part 8a can be selectively set hard. However, when the small-diameter part 8a of the elastic material grommet 8 is too soft, the formation of a gap between the elastic material grommet 8 and the rim 7 may occurs due to a sudden change in a centrifugal force caused by vibration, acceleration or deceleration during traveling. Conversely, when the small-diameter part 8a is too hard, flexibility as a valve grommet becomes insufficient.

The foregoing means for selectively setting the small-diameter part 8a of the elastic material grommet 8 hard can be applied to the fourth to sixth embodiments. By such a combination, the leakage of pressure can be prevented more effectively.

In each of the foregoing embodiments, the rotatable pressure vessel was composed of the wheel rim and the pneumatic tire. However, the invention can be applied to various rotatable pressure vessels requiring the management of temperature, pressure, and so on. Moreover, no particular limitation is placed on internal information to be detected, and in addition to temperature and pressure, humidity and so on can be cited.

EXAMPLE

With regard to a tire internal information detector comprising a pressure injection valve penetrating a rim and fixed to the rim, and an information detection unit located in a tire air chamber to detect information inside a tire and united with the pressure injection valve, the embodiments 1 to 2 of the invention and a conventional example 1, different from one another only in the disposition of electronic components in the information detection unit, were installed in wheel rims, respectively.

Embodiment 1

As shown in FIG. 1, a battery was disposed in the position of a center plane P, a sensor substrate was disposed in one side of the regions divided by the center plane P, and a transmitter substrate was disposed in the opposite side of the regions divided by the center plane P. A center of gravity $G_1$ for the information detection unit was thereby set on the center plane P.

Embodiment 2

As shown in FIG. 4, a battery was disposed in one side of the regions divided by a center plane P, and a sensor/transmitter substrate was disposed in the opposite side of the regions divided by the center plane P. A center of gravity $G_1$ for the information detection unit was thereby set on the center plane P.

Conventional Example 1

A battery, a sensor substrate, and a transmitter substrate were randomly disposed, and a center of gravity G1 for the information detection unit was set in a position shifted by 15 mm from a center plane P.

A pneumatic tire was loaded on a wheel provided with the internal information detector of each of the embodiments 1 to 2 and the conventional example 1. Its initial inner pressure was set at 220 kPa, and 80-hour traveling was carried out at a speed of 120 km/h. Then, after the traveling of about 9600 km, the inner pressure was measured again. The result is shown in Table 1.

TABLE 1

|  | Embodiment 1 | Embodiment 2 | Conventional example 1 |
| --- | --- | --- | --- |
| Inner pressure before traveling (kPa) | 220 | 220 | 220 |
| Inner pressure after traveling (kPa) | 220 | 220 | 205 |

As can be understood from Table 1, there were no reductions in pressure after traveling in the embodiments 1 and 2. On the other hand, in the conventional example 1, the inner pressure was reduced to 205 kPa after traveling.

Regarding a tire internal information detector comprising a pressure injection valve penetrating a rim and fixed to the rim, and an information detection unit located in a tire air chamber to detect information inside a tire and united with the pressure injection valve, the embodiment 3 of the invention and a conventional example 2, different from each other only in a center of gravity for the entire detection apparatus, were installed in wheel rims, respectively.

Embodiment 3

As shown in FIG. 5, a metallic cap was fitted in the outer end part of a pressure injection valve, and a center of gravity G for the entire detection apparatus was set on an attached portion to the rim.

Conventional Example 2

A resin-made cap was fitted in the outer end part of a pressure injection valve, and a center of gravity G for the entire detection apparatus was set in a position shifted inward by 15 mm from an attached portion to the rim.

A pneumatic tire was loaded in a wheel provided with the internal information detector of each of the embodiment 3 and the conventional example 2. Its initial inner pressure was set at 220 kPa, and 80-hour traveling was carried out at a speed of 120 km/h. After the traveling of about 9600 km, the inner pressure was measured again. The result is shown in Table 2.

TABLE 2

|  | Embodiment 3 | Conventional example 2 |
| --- | --- | --- |
| Inner pressure before traveling (kPa) | 220 | 220 |
| Inner pressure after traveling (kPa) | 220 | 205 |

As can be understood from Table 2, there was no reduction in pressure after traveling in the embodiment 3. On the other hand, in the conventional example 2, the inner pressure was reduced to 205 kPa after traveling.

Regarding a tire internal information detector comprising a pressure injection valve penetrating a rim, and an information detection unit located in a tire air chamber to detect information inside a tire and united with the pressure injection valve, the embodiments 4 to 7 of the invention and a conventional example 3, different from one another only in the attaching structure, were installed in wheel rims, respectively.

Embodiment 4

The pressure injection valve was attached through an elastic material grommet to the rim, and the information detection unit was secured to a pedestal provided in the rim by using a screw member.

Embodiment 5

The pressure injection valve was attached through an elastic material grommet to the rim, and the information detection unit was secured to a pedestal provided in the rim by using adhesive.

Embodiment 6

The pressure injection valve was attached through an elastic material grommet to the rim. A hardness Hs of the small-diameter part of the elastic material grommet was set at 80; and a hardness Hs of the large-diameter part thereof at 68.

Embodiment 7

The pressure injection valve was attached through an elastic material grommet to the rim. A hardness Hs of the elastic material grommet was set at 68, the volume of a space formed between a through-hole and the pressure injection valve was set smaller by 5% than that of the small-diameter part of the elastic material grommet, and the small-diameter part was held in a compressed state.

Conventional Example 3

The pressure injection valve was attached through an elastic material grommet to the rim, and a hardness Hs of the elastic material grommet was set at 68.

A pneumatic tire was loaded on a wheel provided with the internal information detector of each of the embodiments 4 to 7 and the conventional example 3. Its initial inner pressure was set at 220 kPa, and after 1-hour traveling at a speed of 120 km/h, the inner pressure was measured again. The result is shown in Table 3.

TABLE 3

|  | Embodiment 4 | Embodiment 5 | Embodiment 6 | Embodiment 7 | Conventional example 3 |
| --- | --- | --- | --- | --- | --- |
| Inner pressure before traveling (kPa) | 220 | 220 | 220 | 220 | 220 |
| Inner pressure after traveling (kPa) | 220 | 220 | 220 | 220 | 200 |
| Pressure reduction rate (%) | 0 | 0 | 0 | 0 | 10 |

As can be understood from Table 3, no pressure reductions occurred after traveling in the embodiments 4 to 7. On the other hand, in the conventional example 3, a pressure reduction rate after traveling reached 10%.

As apparent from the foregoing explanations, according to the present invention, the internal information detector comprises the pressure injection valve penetrating the partition wall of the rotatable pressure vessel, the pressure injection valve being fixed thereto; and the information detection unit located in the pressure vessel to detect information inside the vessel, the information detection unit being united with the pressure injection valve. In this internal information detector, it is possible to prevent the leakage of pressure from the attached portion thereof, and also to prevent the interference between the information detection unit and the pressure vessel. Moreover, it is possible to prevent the leakage of pressure for a long period of time.

What is claimed is:

1. An attaching structure of an internal information detector for a pressure vessel being an assembly of a tire and a wheel, the internal information detector comprising a pressure injection valve penetrating a partition wall of a rotatable pressure vessel, and an information detection unit located in the pressure vessel to detect information inside the vessel and having a box-shaped configuration with six side walls, the partition wall having a partition wall surface disposed internally of the pressure vessel, the information detection unit being united with the pressure injection valve through one side wall, wherein the pressure injection valve is attached to the pressure vessel with a grommet made of an elastic material interposed therebetween and in contact with the one side wall, and the information detection unit is secured to a pedestal, the pedestal being affixed on the partition wall surface of the pressure vessel on another side wall adjoining the one side wall.

2. An attaching structure of an internal information detector for a pressure vessel according to claim 1, wherein the information detection unit is secured to the pedestal by using mechanical connecting means.

3. An attaching structure of an internal information detector for a pressure vessel according to claim 1, wherein the information detection unit is secured to the pedestal by using adhesive.

4. An attaching structure of an internal information detector for a pressure vessel according to any one of claims 1 to 3, wherein a through-hole larger than an outer diameter of the pressure injection valve is provided in the partition wall of the pressure vessel; in an outer peripheral side of the pressure injection valve, externally provided are a grommet made of an elastic material having a small-diameter part insertable into the through-hole and a large-diameter part having an outer diameter larger than the through-hole, and a hard grommet; the pressure injection valve is fixed to the pressure vessel while the partition wall is held between the elastic material grommet and the hard grommet; and a hardness Hs (JIS-A) of at least the small-diameter part of the elastic material grommet is set in a range of 70 to 90.

5. An attaching structure of an internal information detector for a pressure vessel according to any one of claims 1 to 3, wherein a through-hole larger than an outer diameter of the pressure injection valve is provided in the partition wall of the pressure vessel; in an outer peripheral side of the pressure injection valve, externally provided are a grommet made of an elastic material having a small-diameter part insertable into the through-hole and a large-diameter part having an outer diameter larger than the through-hole, and a hard grommet; the pressure injection valve is fixed to the pressure vessel while the partition wall is held between the elastic material grommet and the hard grommet; a hardness Hs (JIS-A) of the elastic material grommet is set in a range of 65 to 85; a volume of a space formed between the through-hole and the pressure injection valve is set smaller by 1% to 25% than that of the small-diameter part of the elastic material grommet; and the small-diameter part is held in a compressed state in the space.

6. An attaching structure of an internal information detector for a pressure vessel being an assembly of a tire and a wheel, the internal information detector comprising a pressure injection valve penetrating a partition wall of the rotatable pressure vessel, and an information inside the vessel, the information detection unit being united with the pressure injection valve, wherein a through-hole larger than an outer diameter of the pressure injection valve is provided in the partition wall of the pressure vessel; in an outer peripheral side of the pressure injection valve, externally provided are a grommet made of an elastic material having a small-diameter part insertable into the through-hole, and a large-diameter part having an outer diameter larger than the through-hole, and a hard grommet; the pressure injection valve is fixed to the pressure vessel while the partition wall is held between the elastic material grommet and the hard grommet; and a hardness Hs (JIS-A) of at least the small-diameter part of the elastic material grommet is set in a range of 70 to 90.

7. An attaching structure of an internal information detector for a pressure vessel being an assembly of a tire and a wheel, the internal information detector comprising a pressure injection valve penetrating a partition wall of the rotatable pressure vessel, and an information detection unit located in the pressure vessel to detect information inside the vessel, the information detection unit being united with the pressure injection valve, wherein a through-hole larger than an outer diameter of the pressure injection valve is provided in the partition wall of the pressure vessel; in an outer peripheral side of the pressure injection valve, externally provided are a grommet made of an elastic material having a small-diameter part insertable into the through-hole and a large-diameter part having an outer diameter larger than the through-hole, and a hard grommet; the pressure injection valve is fixed to the pressure vessel while the partition wall is held between the elastic material grommet an the hard grommet; a hardness Hs (JIS-A) of the elastic material grommet is set in a range of 65 to 85; a volume of a space formed between the through-hole and the pressure injection valve is set smaller by 1% to 25% than that of the small-diameter part of the elastic material grommet; and the small diameter part is held in a compressed state in the space.

* * * * *